United States Patent
Goto et al.

(10) Patent No.: US 6,807,292 B1
(45) Date of Patent: Oct. 19, 2004

(54) IMAGE DISPLAYING METHOD AND APPARATUS

(75) Inventors: Yoshihiro Goto, Katsushika-ku (JP); Hiromitsu Hayashi, Arakawa-ku (JP)

(73) Assignee: Hitachi Medical Corporation, Tokyo (JP)

(*) Notice: Subject to any disclaimer, the term of this patent is extended or adjusted under 35 U.S.C. 154(b) by 0 days.

(21) Appl. No.: 09/623,630

(22) PCT Filed: Mar. 9, 1999

(86) PCT No.: PCT/JP99/01122
§ 371 (c)(1),
(2), (4) Date: Sep. 6, 2000

(87) PCT Pub. No.: WO99/46733
PCT Pub. Date: Sep. 16, 1999

(30) Foreign Application Priority Data

Mar. 9, 1998 (JP) .............................................. 10-56977
Jun. 23, 1998 (JP) ............................................ 10-175975

(51) Int. Cl.$^7$ ............................ G06K 9/00; G06T 15/00
(52) U.S. Cl. ........................ 382/128; 382/131; 250/455; 600/425
(58) Field of Search ................................. 382/160, 128, 382/129, 130, 131, 133, 134, 286; 600/407, 425; 128/920, 922; 345/419, 420, 421; 250/455; 356/39; 377/10

(56) References Cited

U.S. PATENT DOCUMENTS

| | | | |
|---|---|---|---|
| 5,360,007 A | * | 11/1994 | Shinomura et al. ......... 600/447 |
| 5,581,671 A | * | 12/1996 | Goto et al. .................. 345/419 |
| 5,734,384 A | * | 3/1998 | Yanof et al. ................. 345/424 |
| 5,782,762 A | | 7/1998 | Vining |
| 5,883,933 A | * | 3/1999 | Goto et al. .................... 378/62 |
| 5,920,319 A | | 7/1999 | Vining et al. |
| 5,953,013 A | | 9/1999 | Shimizu |
| 6,178,220 B1 | * | 1/2001 | Freundlich et al. ............ 378/4 |
| 6,319,201 B1 | * | 11/2001 | Wilk .......................... 600/437 |
| 6,366,800 B1 | * | 4/2002 | Vining et al. ................ 600/425 |

FOREIGN PATENT DOCUMENTS

| | | |
|---|---|---|
| JP | 5-266214 A | 10/1993 |
| JP | 5-266214 | 10/1993 |
| JP | 5-266215 A | 10/1993 |
| JP | 5-266217 A | 10/1993 |
| JP | 06215153 A | 8/1994 |
| JP | 6-215153 | 8/1994 |
| JP | 09270023 A | 10/1997 |
| JP | 9-270023 | 10/1997 |
| JP | 10-63875 | 3/1998 |
| JP | 10063875 A | 3/1998 |

OTHER PUBLICATIONS

*Digital Image Processing*, G. A. Baxes, ©1994, pp. 217–236.
*The Image Processing Handbook* 3/e J. C. Russ, ©1999, pp. 646–649.

* cited by examiner

*Primary Examiner*—Bhavesh M. Mehta
*Assistant Examiner*—Seyed Azarian
(74) *Attorney, Agent, or Firm*—Oliff & Berridge, PLC

(57) ABSTRACT

A plurality of viewpoints are set in a blood vessel included in an original image obtained in such a way that a plurality of CT images are stacked. The viewpoints are manually or automatically set along the blood vessel in the central projection method. Next, a curved surface including the viewpoints (composed of straight lines intersecting the viewpoints) is set. Then, the original image is cut along the curved surface to construct a sectional image of the original image including a sectional image of the blood vessel, and the constructed sectional image is displayed. The displayed sectional image is a longitudinal sectional image of the blood vessel. Therefore, a longitudinal sectional image of an object such as a blood vessel and an intestine cut along a curved surface along the object can be easily constructed.

20 Claims, 19 Drawing Sheets

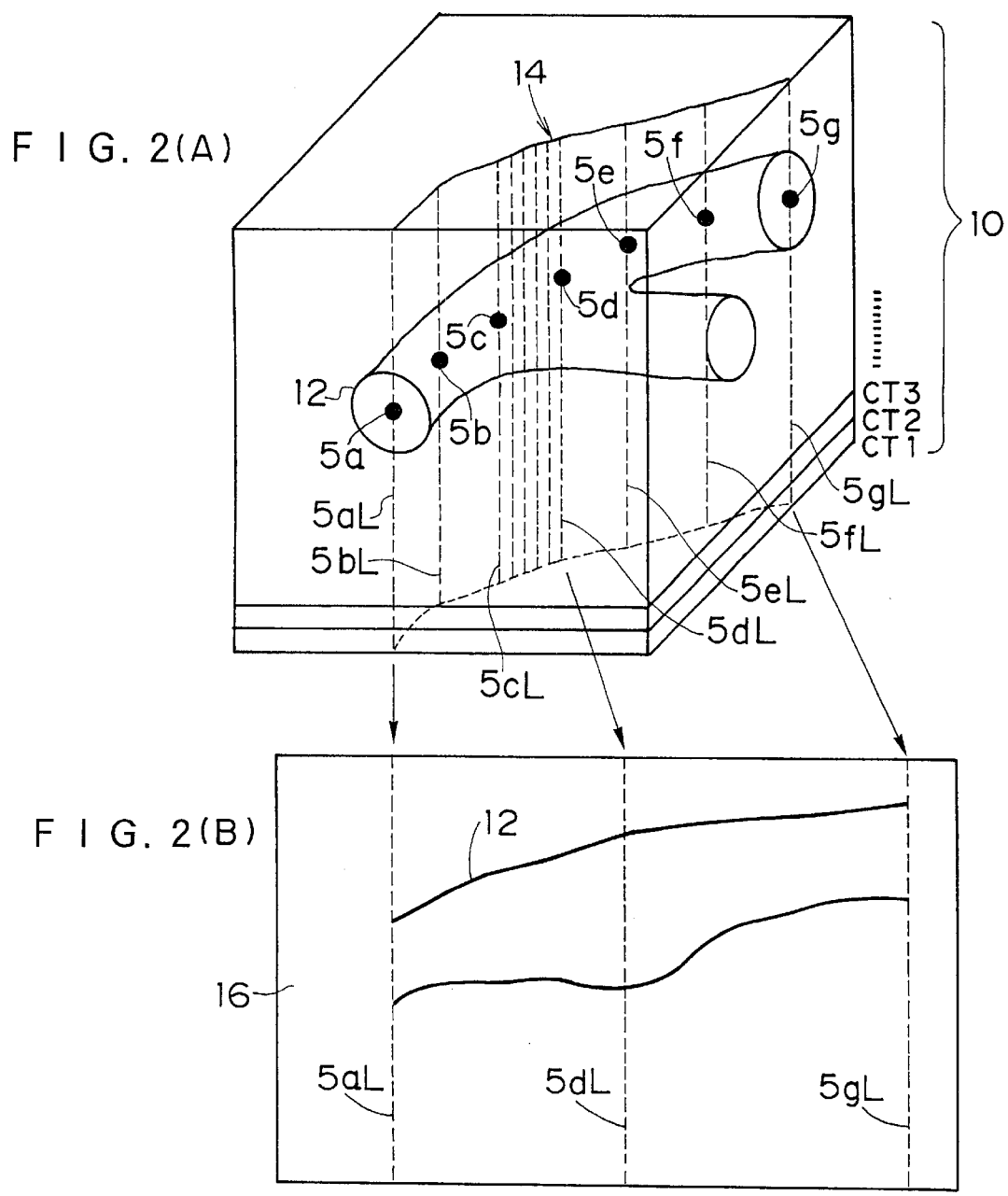
F I G. 2(A)
F I G. 2(B)

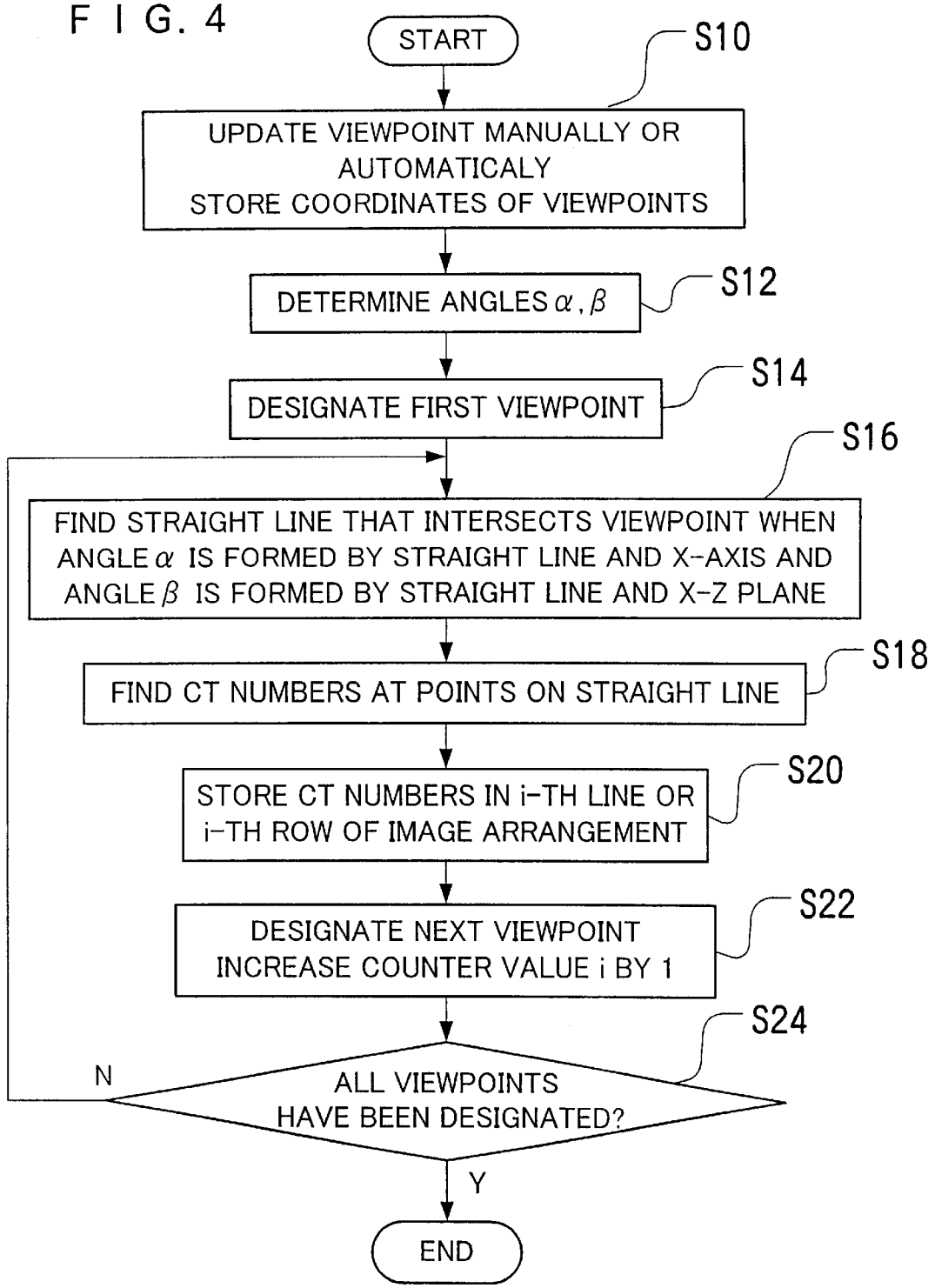

F I G. 7
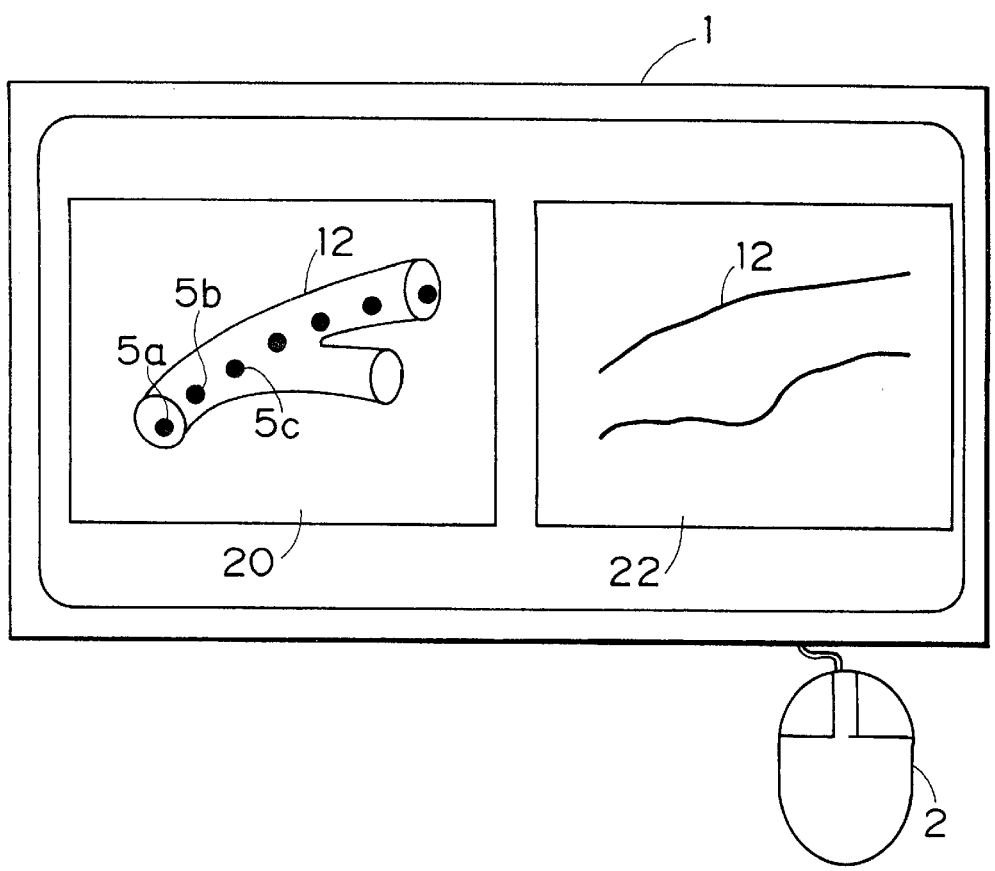

F I G. 8
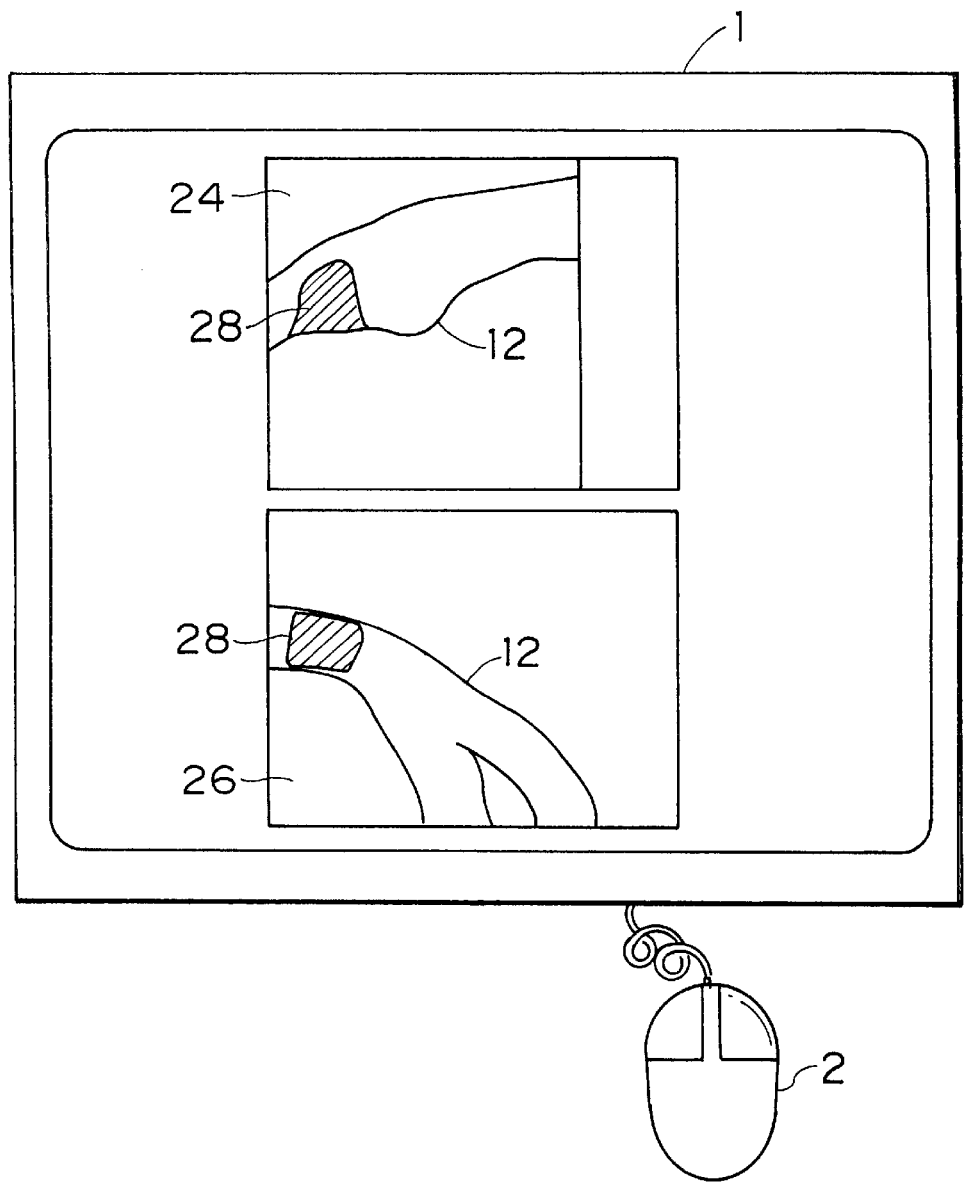

ANIMATION DISPLAY

SHADED 3-D IMAGE

F I G. 1 3
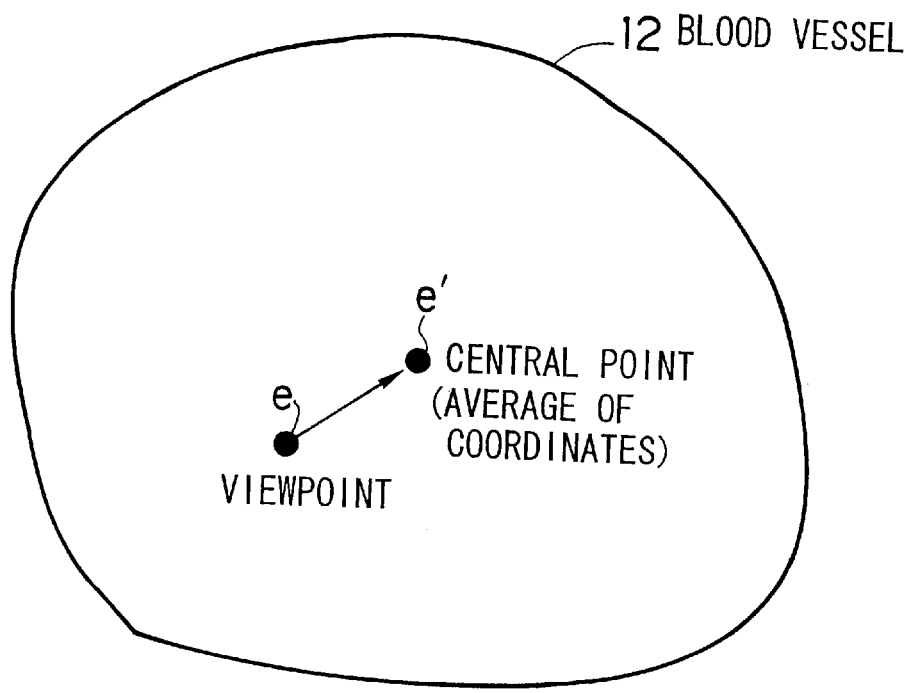

F I G. 1 4 (A)
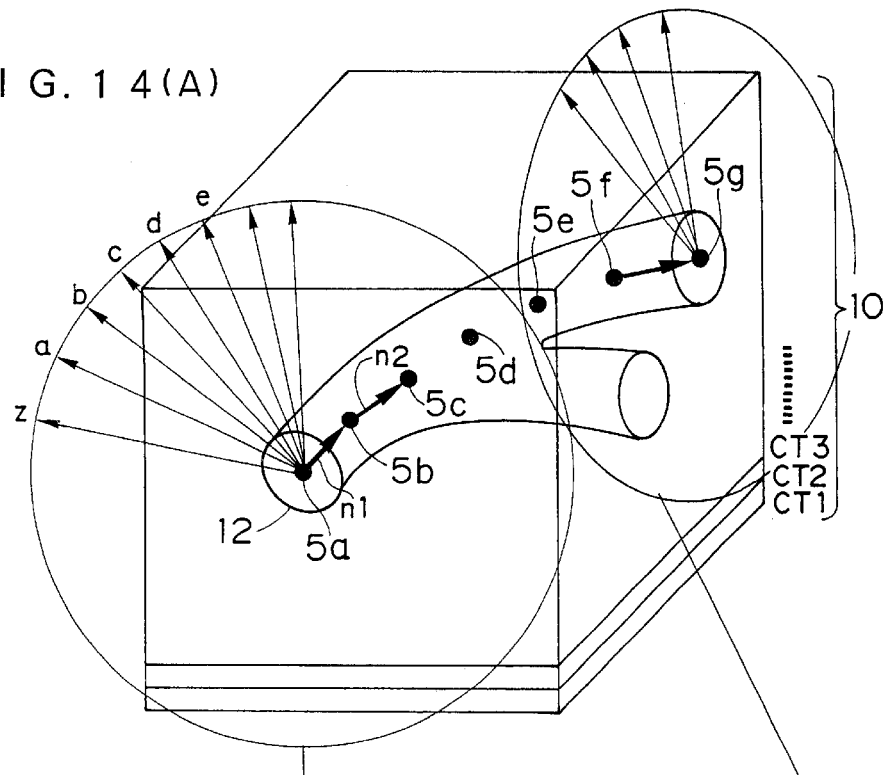
F I G. 1 4 (B)
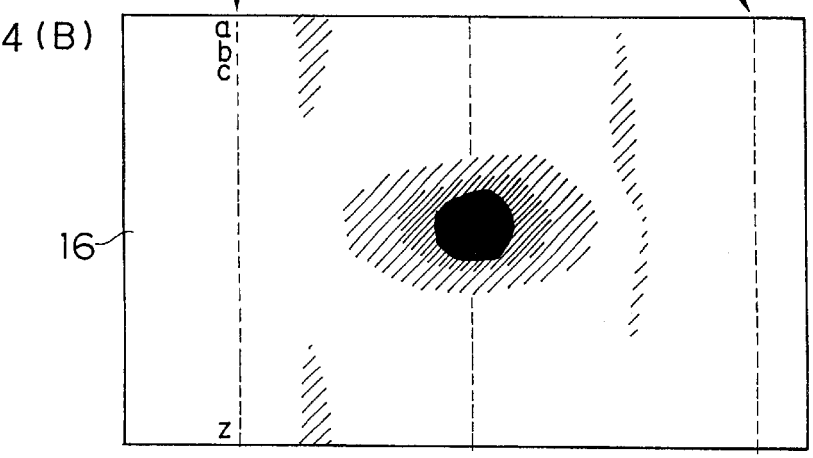

F I G. 1 9
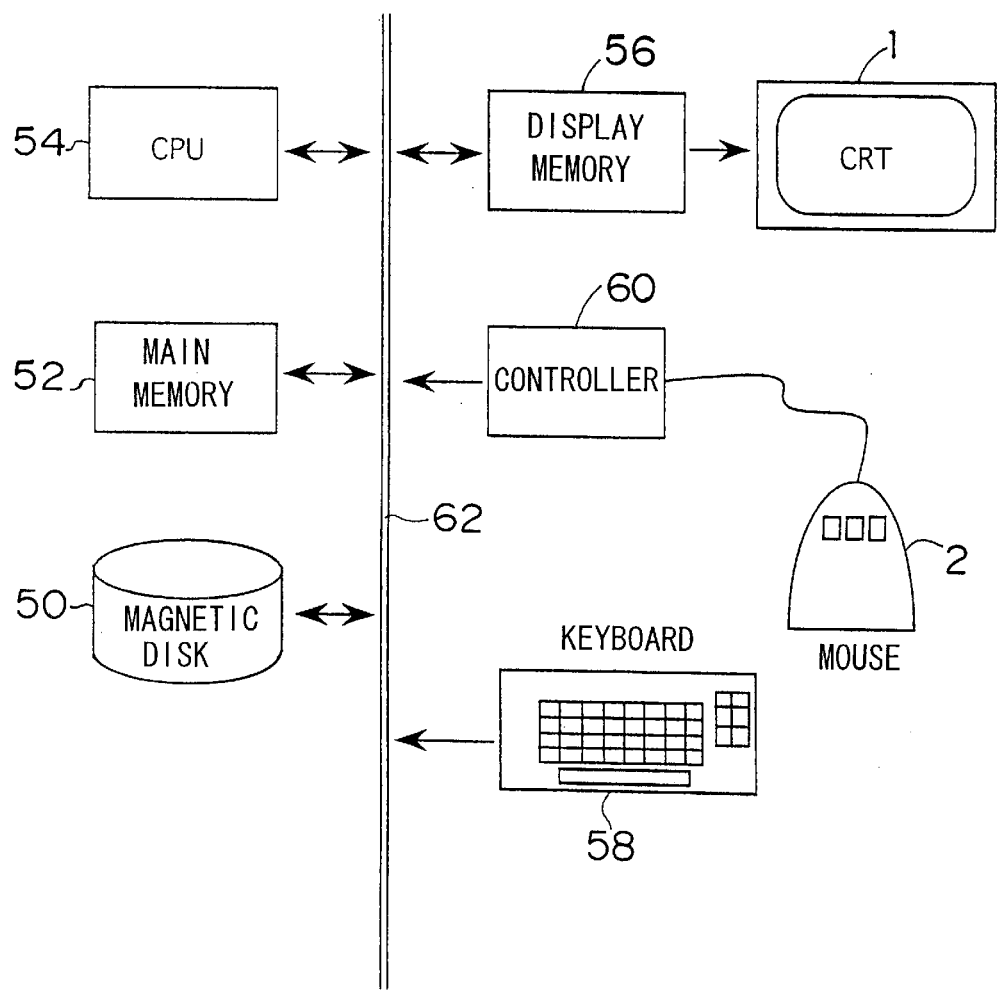

IMAGE DISPLAYING METHOD AND APPARATUS

FIELD OF THE INVENTION

The present invention relates generally to image displaying method and apparatus, and especially to image displaying method and apparatus that can display an image of the inside of an object such as a blood vessel, an intestine, a stomach and a bone.

BACKGROUND OF THE INVENTION

There are a variety of medical images such as an X-ray Computerized Tomography (CT) image, a Magnetic Resonance Imaging (MRI) image, an ultrasonic tomographic image and so on obtained by an X-ray CT apparatus, an MRI apparatus (including MRI for three-dimensional measurement), an ultrasonic diagnosing apparatus, a cone-beam CT apparatus for three-dimensional measurement. An image reconstructed from data obtained by a three-dimensional measurement is called a volume image. A method in which a viewpoint and a projection plane are set and an original image (multiple tomographic images) between the viewpoint and the projection plane is projected as if the original image were seen from the viewpoint has been proposed as a method of acquiring a three-dimensional method from the image obtained by an apparatus. The central projection method and the parallel projection method are known as projection methods.

To obtain an image (endoscope-like image) as if the inside of an object were seen with an endoscope, the central projection image in which the viewpoint can be set in the object is used. The central projection method for obtaining the endoscope-like image is described in detail in Japanese Patent Provisional Publication Nos. 7-210704 and 8-16813. The viewpoint and the line of sight in the central method are sequentially updated so that an endoscope-like projected image is obtained. The viewpoint and the line of sight are sequentially updated in such a way that an operator manually operates an inputting device such as a mouse, or they are sequentially and automatically updated so that the line of sight is directed toward the farthest position from the viewpoint.

However, in case of an endoscope-like image in the central projection image, for example, an image of the inner wall of a blood vessel, it is difficult to realize which blood vessel of the object is displayed and from which position of the blood vessel and in which direction the blood vessel is observed.

The present invention has been developed in view of the above-described circumstances, and has its object the provision of an image displaying method and apparatus in which a sectional image of an object such as a blood vessel and an intestine that is longitudinally cut along a curved surface along the object and an image of the object cut-open so that the inside of the object can be observed including macro information on the vicinity of viewpoints can be displayed.

SUMMARY OF THE INVENTION

To achieve the above-mentioned object, the present invention is directed to an image displaying apparatus, comprising: a viewpoint setting device that sets a plurality of viewpoints in an object included in a three-dimensional original image; a section setting device that sets, as a section, a curved surface including the plurality of viewpoints set by the viewpoint setting device; an image constructing device that constructs a sectional image of the three-dimensional original image including a sectional image of the object by cutting the three-dimensional original image along the section set by the section setting device; and a displaying device that displays the sectional image constructed by the image constructing device.

According to the present invention, viewpoints used in the central projecting method are recorded and they can be used as the viewpoints set by the viewpoint setting device. The section setting device sets the curved surface including the set viewpoints, and the image constructing device constructs the sectional image of the original image cut along the set section. Thus, the sectional image is a longitudinal sectional image of the object such as a blood vessel cut along the curved surface along the object.

In the present invention, the three-dimensional original image including the object is projected onto the predetermined projection plane and the projected image is shaded to construct the three-dimensional image and the three-dimensional image in which the viewpoints set by the viewpoint setting device are superimposed on the three-dimensional image is constructed. The longitudinal sectional image and the three-dimensional image may be displayed on one screen and may be switched.

Two curved surfaces may be used as sections when straight lines composing the curved surfaces are perpendicular to each other, and two sectional images of the object cut along the curved surfaces can be displayed. Curved surfaces as the sections may have different angles. For example, curved surfaces that have angles changing by the same angle within the range of 0°–360° are set as the sections, and sectional images of the original image cut along the sections are sequentially displayed. Thus, the inside of the object such as a blood vessel can be observed as an animation at angles within the range of 0°–360°.

The original image including the sectional image is projected on a predetermined projection image instead of the sectional image and the projected image is shaded to construct a three-dimensional image, and the three-dimensional image is displayed.

The image displaying apparatus according to the present invention has an area designating device that designates an area for resetting at least some of the plurality of viewpoints and a resetting device that resets the viewpoints in the area designated by the area designating device according to viewpoints outside the area by interpolation, and the section setting device sets a curved surface including the plurality of viewpoints set by the viewpoint setting device and the viewpoints reset by the resetting device as a section. The viewpoints set by the viewpoint setting device are displaced from the center of the blood vessel if a thrombus is in the blood vessel. The viewpoints in the area (area designated by the area designating device) is reset from the viewpoints out side the area by interpolation.

To achieve the above-mentioned object, the present invention is directed to an image displaying apparatus, comprising: a viewpoint setting device that sets a plurality of viewpoints in an object included in a three-dimensional original image; a light source setting device that sets, as an imaginary line light source, a curved line intersecting the plurality of viewpoints set by the viewpoint setting device; an image constructing device that projects, with shading, the three-dimensional original image including the object onto a tube-shaped projection surface with the imaginary line light source set by the light source setting device being center and develops the tube-shaped projection surface with the shading to construct a three-dimensional image; and a displaying device that displays the three-dimensional image constructed by the image constructing device.

The light source setting device sets the curved line intersecting the viewpoints, and the image constructing device projects the three-dimensional original image onto the tube-shaped projection surface with the line light source being center from the set line light source and shades the projected image and develops the tube-shaped projection surface to construct the three-dimensional image. Thus, the three-dimensional image is of a cut-open object such as a blood vessel.

In the present invention, a viewpoint setting device sets a plurality of viewpoints in a branching object and a section setting device sets a curved surface including the plurality of viewpoints set by the viewpoint setting device as a section. An image constructing device constructs a sectional image of the three-dimensional original image cut along the set section. Thus, the sectional image is of the branching object.

In the present invention, the original image is cut along a curved surface and a sectional image is displayed as a plane. When two points of the object is designated on the sectional image displayed by a displaying device, a distance calculating device calculates the distance between the two points.

In the present invention, when a designating device designates a region inside the object, an area calculating device calculates the area of the region designated by the designating device.

BRIEF DESCRIPTION OF THE DRAWINGS

FIGS. 2(A) and 2(B) are drawings showing an embodiment of a method of constructing the sectional image;

FIG. 4 is a flowchart showing the method of constructing the sectional image;

FIG. 7 is a drawing showing another display by the image displaying apparatus according to the present invention;

FIG. 8 is a drawing showing another display of the image displaying apparatus according to the present invention;

FIG. 13 is an explanation drawing showing a method of resetting a viewpoint at the center of an object;

FIGS. 14(A) and 14(B) are diagrams showing another method of constructing the sectional image;

FIG. 18 is an explanation drawing showing a method of calculating an area from a three-dimensional image and FIG. 19 is a block diagram showing a hardware structure of the image displaying apparatus according to the present invention.

THE PREFERRED EMBODIMENT OF THE PRESENT INVENTION

The preferred embodiment of the image displaying apparatus according to the present invention will be explained in detail with reference to the attached drawings.

Figure 1:
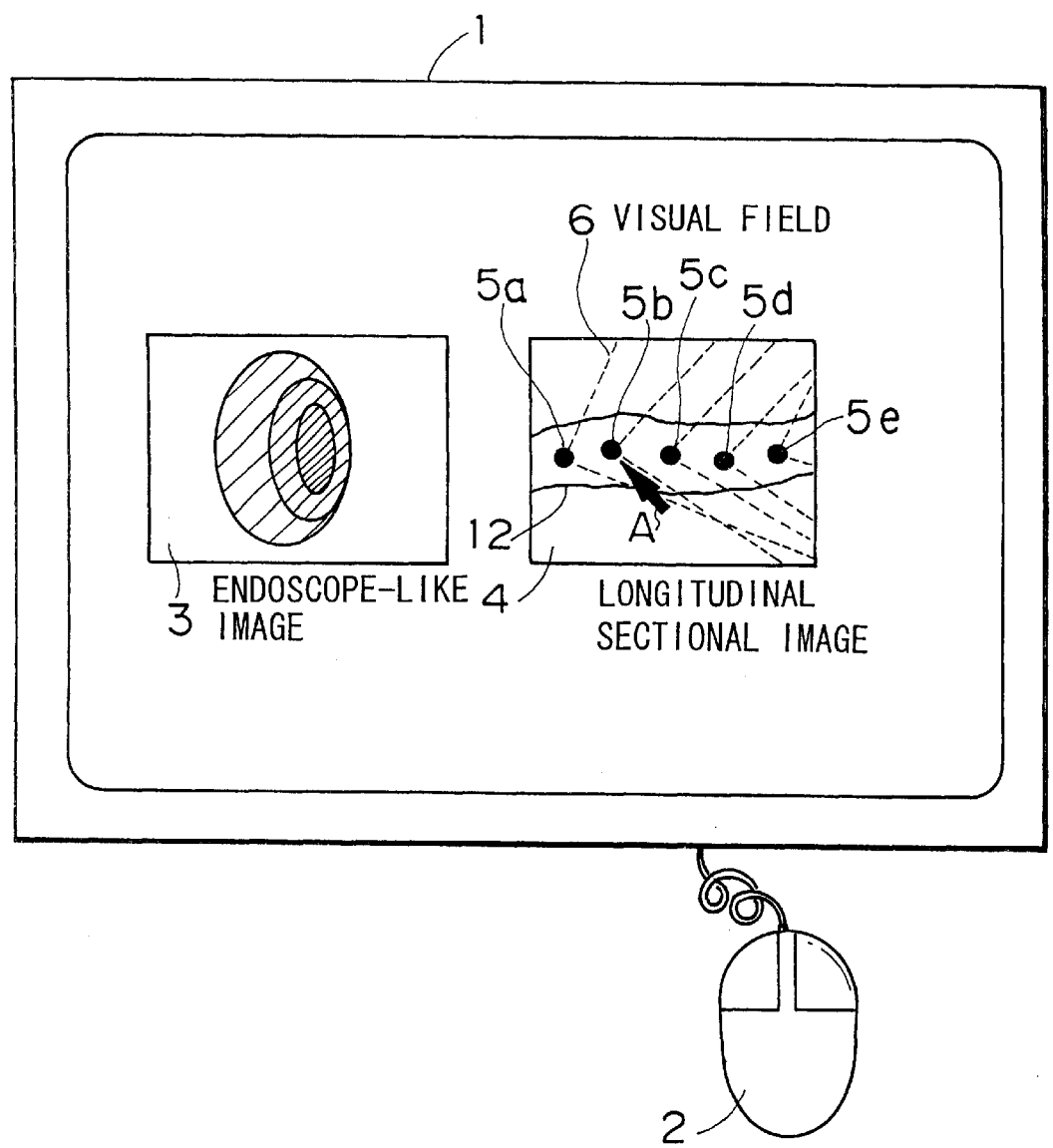
FIG. 1 is a drawing showing a display of images including a sectional image by an image displaying apparatus according to the present invention.

FIG. 1 is a drawing showing images displayed by the image displaying apparatus according to the present invention. In FIG. 1, the reference numeral 1 denotes a CRT monitor, the reference numeral 2 denotes a mouse, the reference numeral 3 denotes a three-dimensional-like image (endoscope-like image) showing the inside of a blood vessel constructed in the central projection method, and the reference numeral 4 denotes a longitudinal sectional image of the blood vessel 12.

The display of the sectional image 4 will now be explained.

FIGS. 2(A) and 2(B) are drawings showing an embodiment of the display of the sectional image 4. In FIG. 2(A), the reference numeral 10 denotes a three-dimensional original image that is obtained in such a manner that a plurality of CT images (CT1, CT2, CT3, . . . ) obtained by an X-ray CT apparatus or the like are stacked, and the reference numeral 12 denotes the blood vessel as the object included in the original image. Reference numerals 5a, 5b, 5c, 5d, 5e, 5f and 5g denote viewpoints that are sequentially set in the blood vessel 12 in the central projection method.

The viewpoints 5a–5g are sequentially set, for example, in such a way that an operator operates a cursor (not shown) on the endoscope-like image 3 in FIG. 1 with the mouse or the like while looking at the endoscope-like image 3, or the viewpoint and the line of sight are sequentially and automatically updated so that the line of sight is directed toward the farthest position from the viewpoint. The central projection method and the method of updating the viewpoint and the line of sight are described in detail in Japanese Patent Provisional Publication Nos. 7-210704 and 8-16813.

In one embodiment of the present invention, the blood vessel 12 is cut along a curved surface (section) 14 including the viewpoints 5a–5g set in the above described way, and the sectional image is displayed. The curved surface 14 includes a plurality of straight lines 5aL–5gL that intersect the viewpoints 5a–5g, and the straight lines 5aL–5gL are parallel to the y-axis that is the stacking direction of the CT images (CT1, CT2, CT3, . . . ).

The longitudinal sectional image 4 (see FIG. 1) of the blood vessel 12 is displayed as follows. First, the straight line 5aL that intersects the viewpoint 5a and is parallel to the y-axis is determined, and CT numbers at points on the straight line 5aL are found from the CT images (CT1, CT2, CT3, . . . ). CT numbers at points between the CT images (CT1, CT2, CT3, . . . ) are found by interpolation. The CT numbers at the points on the straight line 5aL are stored in a memory 16 (FIG. 2(B. CT numbers at points on the straight lines 5bL–5gL that intersect the viewpoints 5b–5g are stored in the memory 16 in the same way. If the intervals between the straight lines (viewpoints) are long, straight lines with intervals short enough for desired image quality are determined as shown between the straight lines 5cL and 5dL and CT numbers at points on the straight lines are stored in the memory 16.

The longitudinal sectional image 4 of the blood vessel 12 in FIG. 1 is displayed on the CRT monitor 1 with the CT numbers stored in the memory 16 being density information. As shown in FIG. 1, the viewpoints 5a–5e may be displayed with the sectional image 4, and the visual field of the endoscope-like image 3 constructed in the central projection image may be displayed by dotted lines 6. Also, the viewpoint for the endoscope-like image 3 on the CRT monitor 1 may be displayed by an arrow A on the sectional image 4, and the endoscope-like image 3 may be changed when the arrow A is moved to another viewpoint by the mouse 2.

Figure 3A:
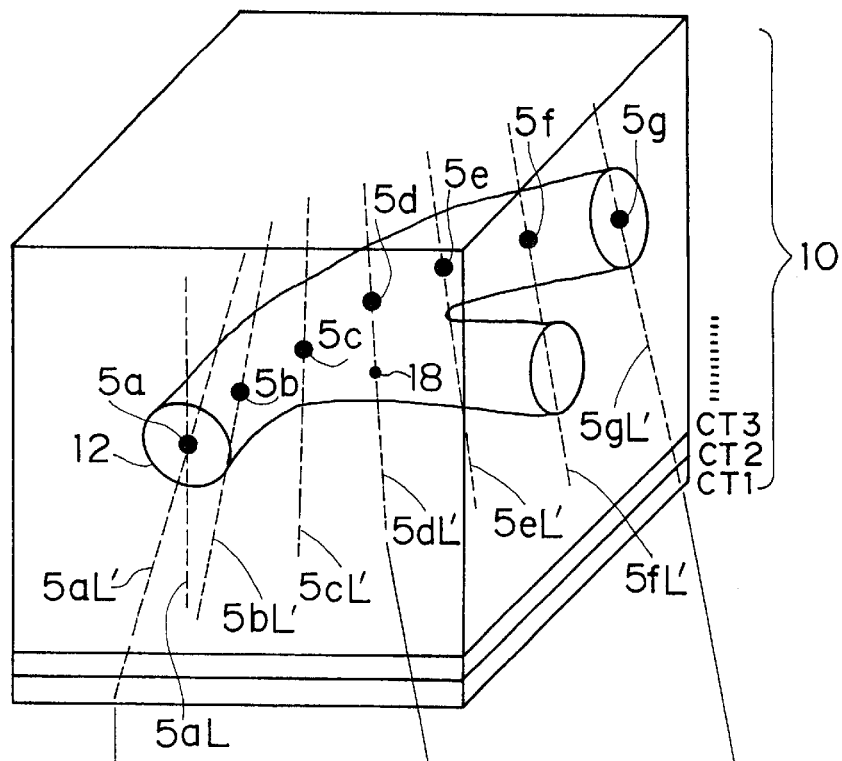
FIGS. 3(A) and 3(B) are drawings showing another embodiment of a method of constructing the sectional image.
Figure 3B:
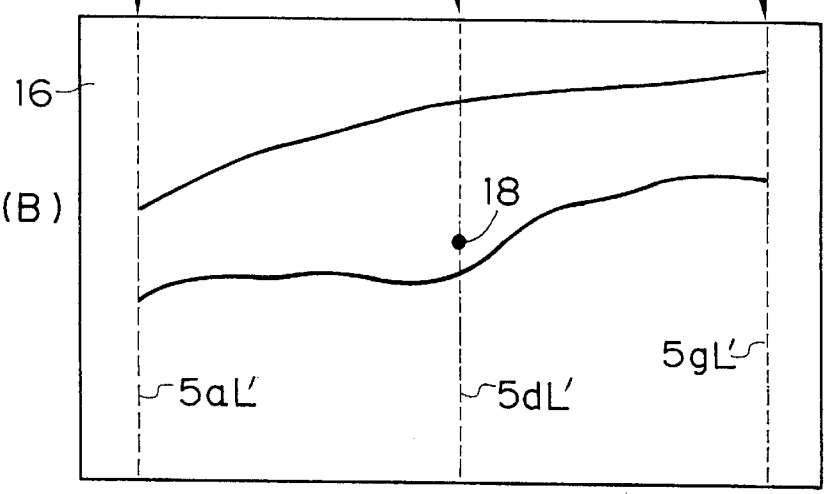

FIGS. 3(A) and 3(B) are drawings showing an embodiment of the method of constructing the sectional image. In the embodiment shown in FIGS. 2(A) and 2(B), the straight lines 5aL–5gL intersecting the viewpoints 5a–5g are parallel to one of the axes (the y-axis) of the three-dimensional original image 10. At the same time, in the embodiment shown in FIGS. 3(A) and 3(B), constant angles are formed between straight lines 5aL'–5gL' intersecting the viewpoints 5a–5g and one of the axes.

The constant angle is formed between the straight line 5aL' and the straight line 5aL. The constant angles are formed between the straight lines 5bL'–5gL' and the straight lines 5bL–5gL in the same way. FIG. 3(B) show the memory 16 storing CT numbers at points on the straight lines 5aL'–5gL'. For example, the CT number at a point on the straight line 5dL' is stored at a corresponding position of the memory 16 in FIG. 3(B).

The method of constructing the sectional image will now be explained with reference to the flowchart in FIG. 4.

Figure 5:
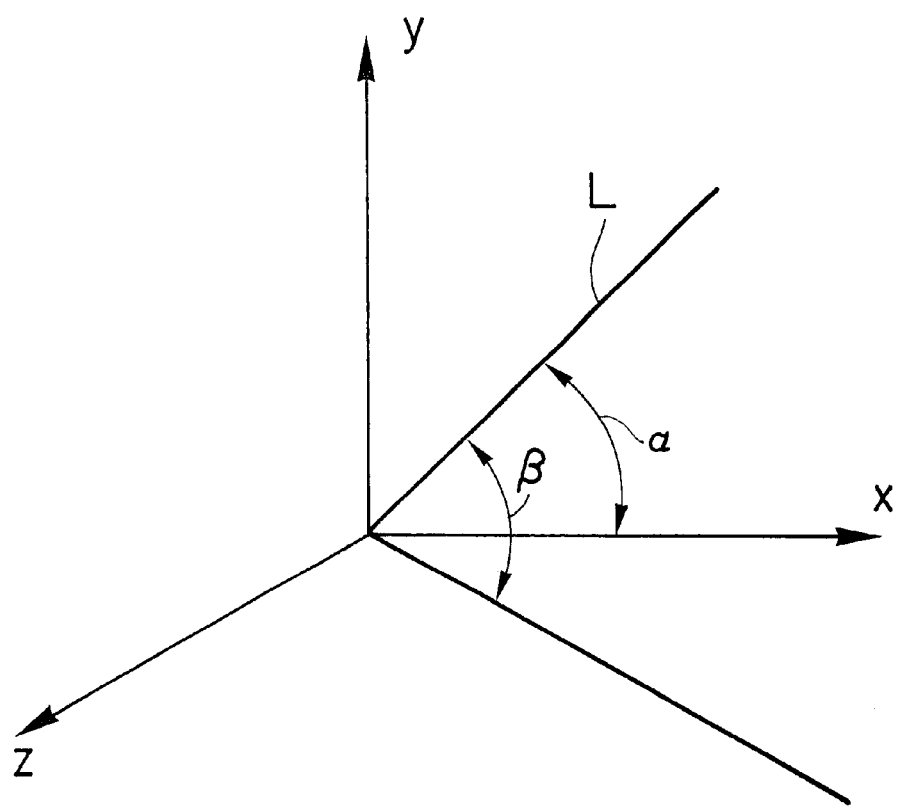
FIG. 5 is an explanation drawing showing the relationship between the axes of a three-dimensional original image and a straight line intersecting a viewpoint.

First, a viewpoint is set inside the object such as the blood vessel, and the viewpoint is updated manually or automatically so that the viewpoint moves inside the object, and coordinates of each viewpoint $e_i$ (i=0, 1, 2, ..., n) are stored (step S10). Then, angles $\alpha$ and $\beta$ formed by straight lines intersecting the viewpoints and an axis of the three-dimensional original image 10 are determined, and a counter value i is set at 0 (step S12). As shown in FIG. 5, the angle $\alpha$ is the angle between a straight line L and the x-axis, and the angle $\beta$ is the angle between the straight line L and the x-z plane.

Next, the first viewpoint $e_0$ is designated as the viewpoint $e_i$ (step S14). Then, a straight line $L_i$; that intersects the determined viewpoint $e_i$ (the first viewpoint $e_0$ at first) is found when the angle $\alpha$ is formed by the straight line $L_i$ and the x-axis and the angle $\beta$ is formed by the straight line $L_i$ and the x-z plane (step S16). Then, CT numbers at points on the found straight line $L_i$ are read from the three-dimensional original image 10, and are found by interpolation as need arises (step S18), and are stored in the i-th line or the i-th row of the image arrangement of the memory (step S20).

After that, the counter value i is increased by 1, and the next viewpoint $e_i$ is designated (step S22). Then, it is determined whether or not all the viewpoints have been designated (step S24), in other words, it is determined whether or not the counter value i is larger than the counter value n of the last viewpoint $e_n$ (n is previously inputted with a key). If the counter value i is the counter value n or smaller (i≦n), the routine from step S16 to step S24 is repeated.

On the other hand, if it is determined that all the viewpoints have been designated, the counter value i is larger than the counter value n (i>n), the processing for constructing the sectional image is ended.

Image signals that have the CT numbers stored in the memory at step S20 as the density information are outputted to the CRT monitor, so that the longitudinal sectional image of the object such as the blood vessel is displayed.

Figure 6A:
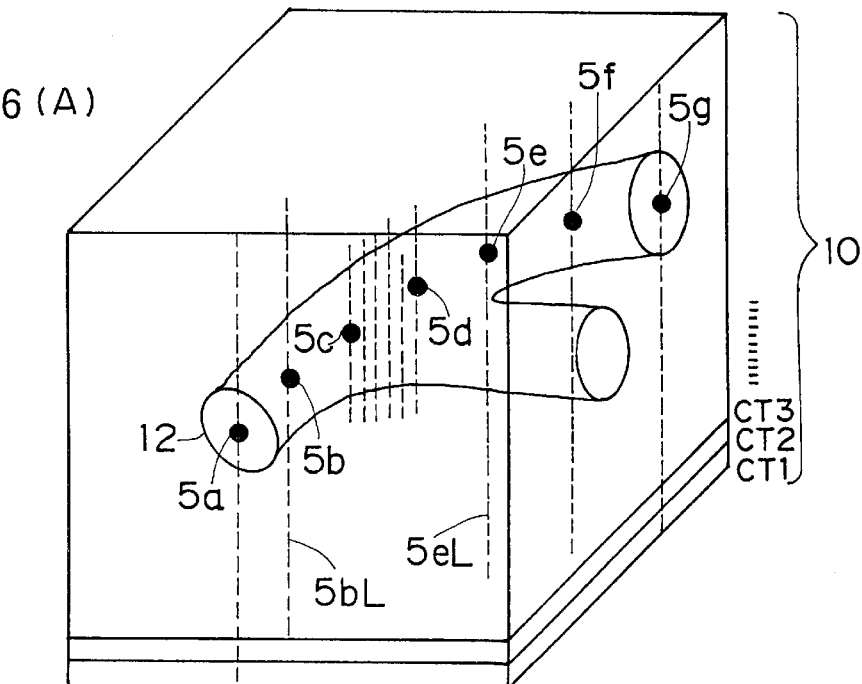
FIGS. 6(A) and 6(B) are drawings showing another embodiment of the method of constructing the sectional image.
Figure 6B:
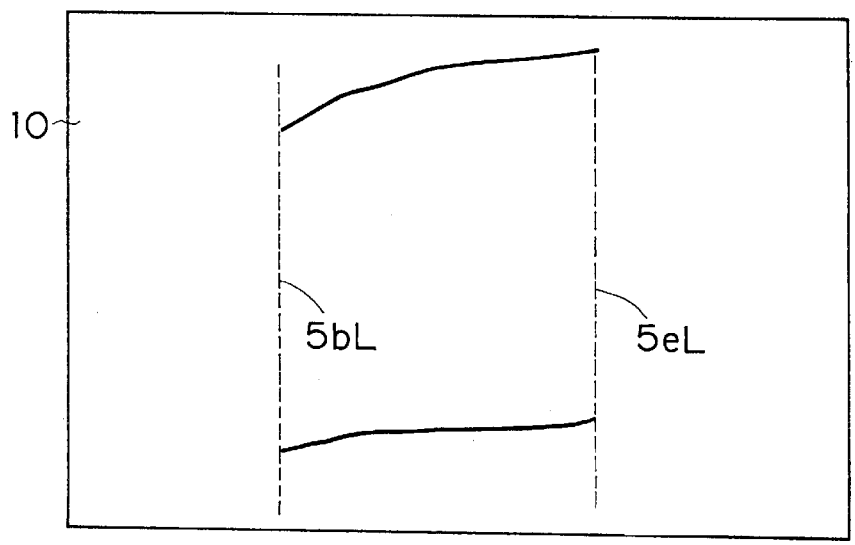

FIGS. 6(A) and 6(B) are drawings showing an embodiment of the method of constructing the sectional image. In the embodiment shown in FIGS. 6(A) and 6(B), an enlarged sectional image showing only the area between the straight lines 5bL–5eL is displayed.

FIG. 7 shows another display of the image displaying apparatus according to the present invention. In FIG. 7, the reference numeral 20 denotes a three-dimensional image including the blood vessel 12, and the reference numeral 22 denotes a longitudinal sectional image of the blood vessel 12. The three-dimensional image 20 is constructed in such a manner that the three-dimensional original image 10 including the blood vessel 12 is parallel-projected onto a projection plane and the projected image is shaded in the surface method or volume rendering method. The viewpoints 5a, 5b, 5c, ... are displayed on the three-dimensional image 20.

FIG. 8 shows another display of the image displaying apparatus according to the present invention. As shown in FIG. 8, two longitudinal sectional images 24, 26 of the blood vessel 12 are displayed on the CRT monitor 1. The sectional image 24 is constructed in such a manner that the original image 10 is cut along a curved surface composed of straight lines that are parallel to the y-axis, and the sectional image 26 is constructed in such a manner that the original image 10 is cut along a curved surface composed of straight lines that are parallel to the z-axis.

Therefore, the sectional image 24 and the sectional image 26 are perpendicular to each other, and a thrombus 28 in the blood vessel 12 can be observed from above and side, and a diagnosis can be made more accurately.

The sectional image 24 and the sectional image 26 are displayed on the CRT monitor 1 side by side, but they may be displayed on separate screens, which are switchably displayed.

Figure 9A:
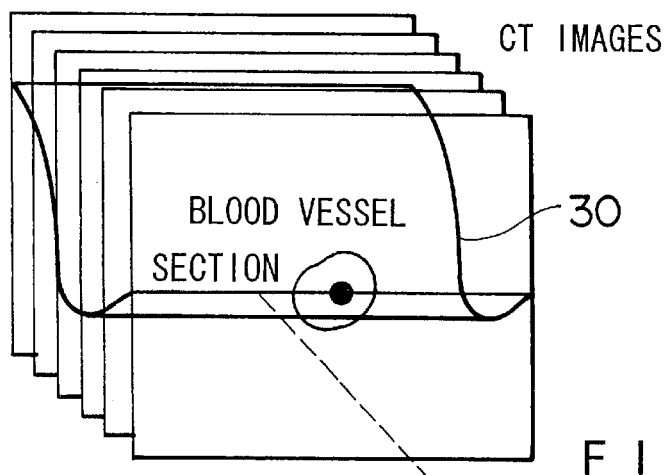
FIGS. 9(A), 9(B) and 9(C) are drawings showing another display changed from the display shown in FIG. 8.
Figure 9C:
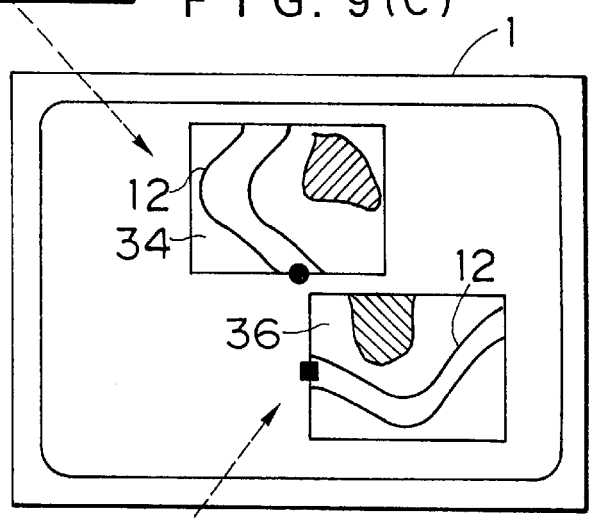
Figure 9B:
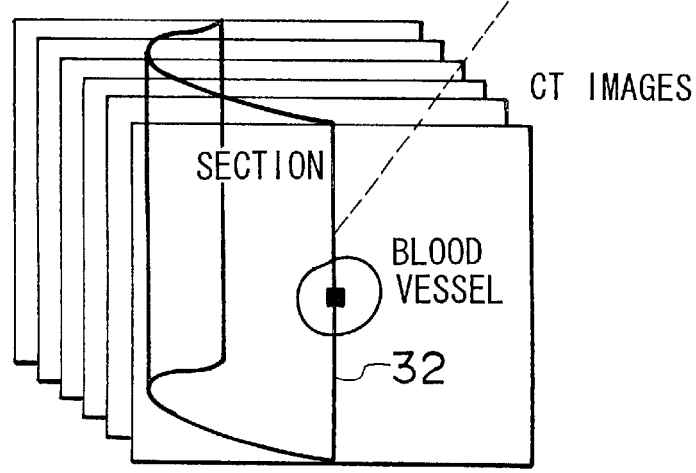

FIGS. 9(A), 9(B) and 9(C) show another display changed from the display shown in FIG. 8. The original image 10 is cut along two curved surface (sections) 30, 32 as shown in FIGS. 9(A) and 9(B), and sectional images 34, 36 including the blood vessel 12 cut across the sections 30, 32 are displayed on the CRT monitor 1 as shown in FIG. 9(C).

The sectional image 34 is a sectional image of the blood vessel 12 seen from above in FIG. 9(A), and the sectional image 36 is a sectional image of the blood vessel 12 seen from the right in FIG. 9(B).

Figure 10A:
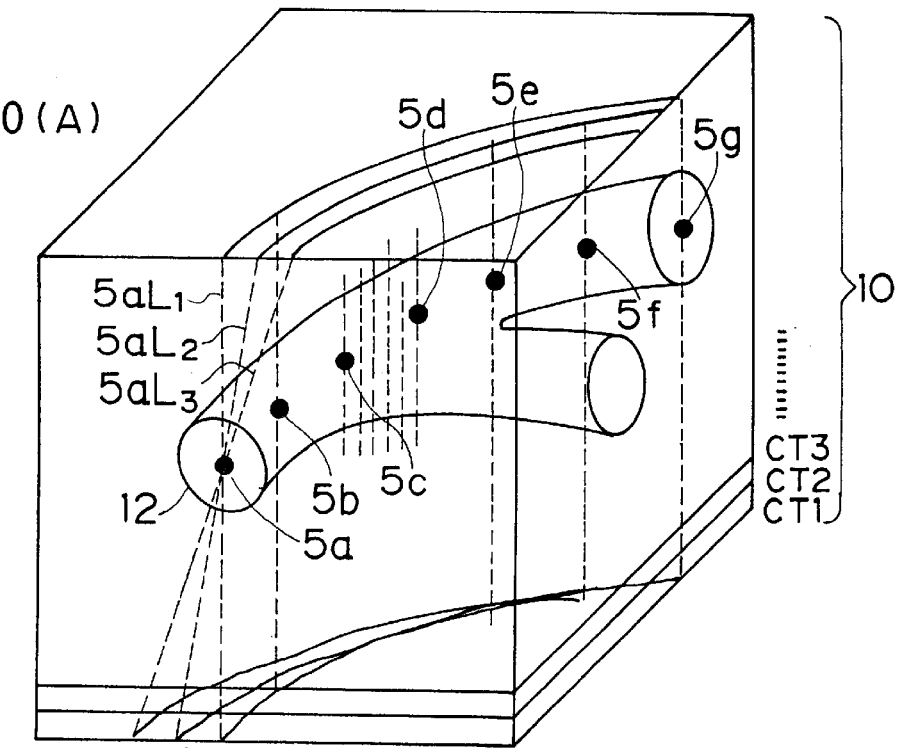
FIGS. 10(A) and 10(B) are diagrams showing the method of constructing an animated sectional image.
Figure 10B:
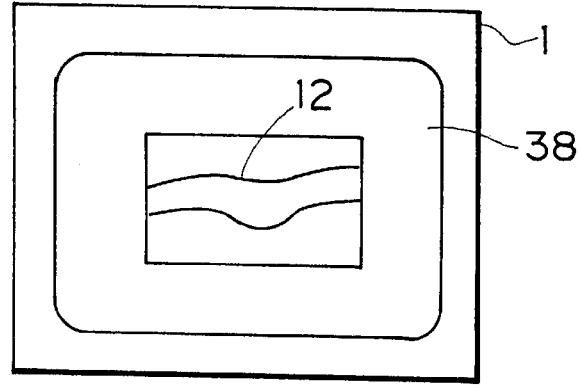

FIGS. 10(A) and 10(B) are diagrams showing the method of constructing an animated sectional image. As shown in FIGS. 10(A) and 10(B), a plurality of straight lines $5aL_1$, $5aL_2$, $5aL_3$, ... that intersect the viewpoint 5a are set. Each straight line is inclined to the y-axis at a predetermined angle. Straight lines intersecting the viewpoints 5b–5g are set in the same way. CT numbers at points on straight lines with the same inclination angle as the straight line $5aL_1$, are stored in the memory to construct image data of the first frame, and CT numbers at points on straight lines with the same inclination angles as the straight lines $5aL_2$, $5aL_3$, ... are stored in the memory to construct image data of the second frame, the third frame, .....

The image data is outputted to the CRT monitor 1 on the frame-by-frame basis as shown in FIG. 10(B), so that an animation (sectional image) 38 whose section is continuously changed is displayed.

Figure 11A:
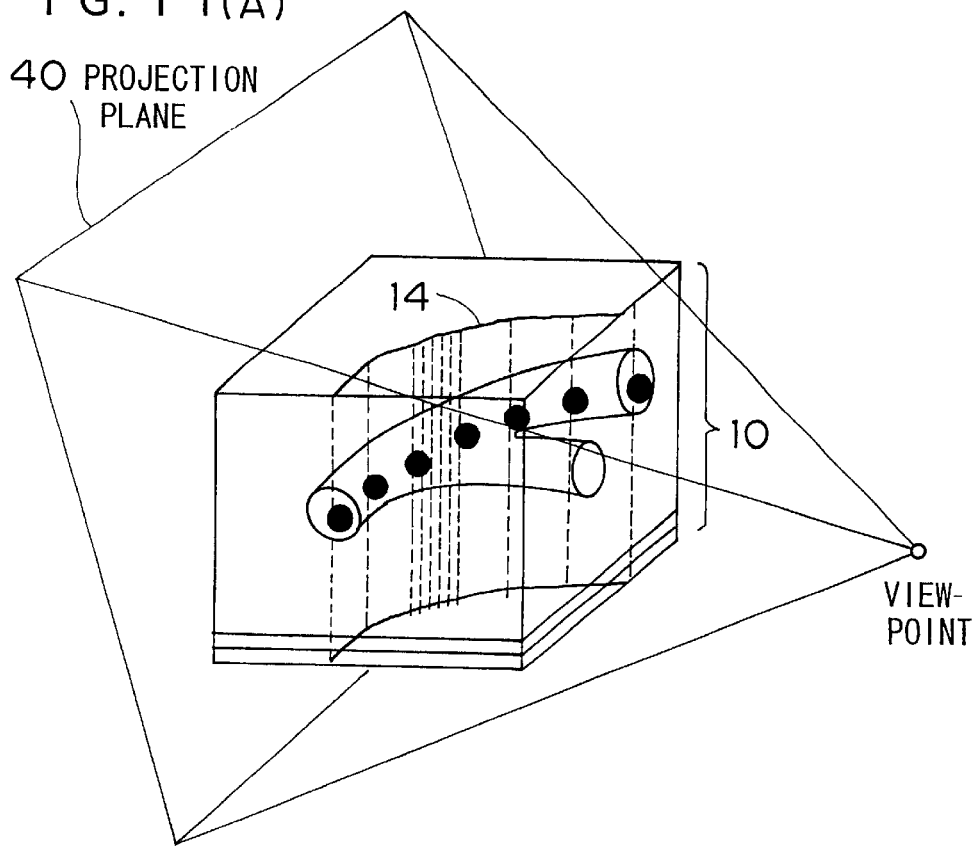
FIGS. 11(A) and 11(B) are diagrams showing the method of constructing an image other than the sectional image.
Figure 11B:
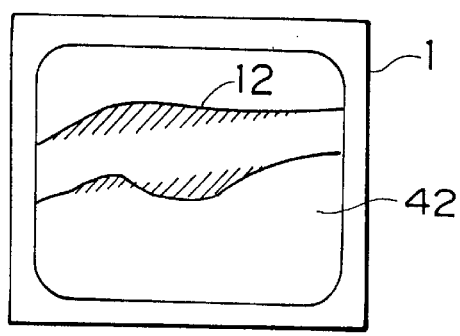

FIGS. 11(A) and 11(B) are diagrams showing the method of constructing an image other than the sectional image. The above-described sectional image is a two-dimensional image without shading. In the method shown in the FIGS. 11(A) and 11(B), the three-dimensional original image 10 is cut along the curved surface 14 including the viewpoints, and the original image 10 is projected onto the projection plane 40 in the state that one side of the cut original image 10 is eliminated or the original image 10 has the same effect as the elimination of one side (for example, the processing range is restricted), and the projected image is shaded in the surface method, the volume rendering method or the like to construct a three-dimensional image. If the viewpoint in the FIG. 11(A) is set at the infinite-point from the projection plane 40, the original image 10 is parallel-projected.

FIG. 11(B) shows the shaded three-dimensional image 42 of the longitudinally-cut blood vessel 12. In this method, the shaded three-dimensional image 42 is obtained instead of the sectional image displayed according to the CT numbers.

The method of resetting some of the viewpoints that have been manually or automatically set will now be explained.

Figure 12:
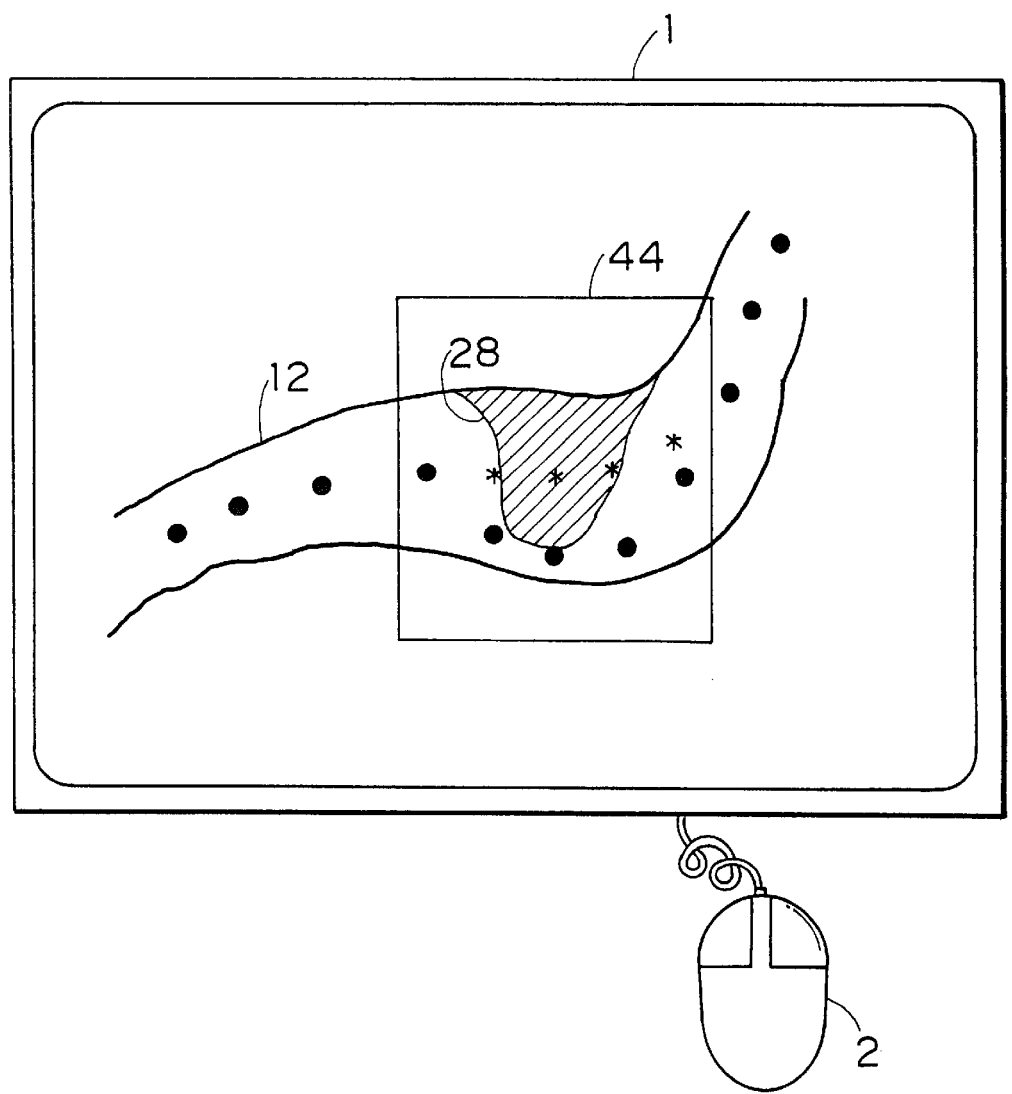
FIG. 12 is an explanation drawing showing a method of resetting some of the viewpoints.

The viewpoints that are manually or automatically set are ordinarily in the substantial center of the pass of the blood (including contrast medium) in the blood vessel 12 as indicated by black spots in FIG. 12. In this case, if the thrombus 28 is in the blood vessel 12, some viewpoints are displaced from the center of the blood vessel 12.

When some of the viewpoints are to be reset, an area 44 for the resetting of the viewpoints is designated as shown in FIG. 12. Viewpoints in the designated area 44 are found by interpolation such as spline interpolation according to the viewpoints outside the designated area 44, and the found viewpoints (indicated by * in FIG. 12) are stored instead of the viewpoints indicated by the spots in the designated area 44.

Thus, the sectional image of the thrombus 28 can be displayed.

Another method of resetting some of the viewpoints that have been manually or automatically set will now be explained.

The viewpoint e that is manually or automatically set is not always in the curvature center of the inner wall of the blood vessel 12 as shown in FIG. 13. The blood vessel 12 is cut along a plane including the viewpoint e as shown in FIG. 13, and inner wall of the blood vessel 12 is determined according to CT numbers at the points on the plane, and average values of the coordinates of points composing the inner wall are found. The average values are the coordinates of the central point e' of the inner wall, and thus the central point e' is stored instead of the viewpoint e.

Therefore, the blood vessel 12 can be cut along the section (curved surface) including the center of the blood vessel 12.

FIGS. 14(A) and 14(B) are diagrams showing another method of constructing the sectional image.

As shown in FIG. 14(A), the three-dimensional original image 10 is projected onto inner surfaces of cylinders with line segments n1 that are a line segment n1 between the viewpoints 5a and 5b, a line segment n2 between the viewpoints 5b and 5c, . . . being the axes as projection surfaces from the viewpoints, and the projected images are shaded. For example, projection lines from the viewpoint 5a are perpendicular to the line segment nil, and they radiate to projection positions a–z at fixed angles. Any one of the following shading methods can be used; the surface method, the volume rendering method and the depth method.

The original image 10 is projected onto the tube shaped projecting surface with a curved line including the viewpoints 5a–5g as an imaginary line light source being the center, and the projected images are shaded.

Image information on the projected images is stored in the memory 16 in such a way that the projected images are developed as lines. The starting position (angle) a of the development can be arbitrarily set.

Thus, the three-dimensional image of the cut-open blood vessel 12 is displayed from the image information stored in the memory 16.

Figure 15A:
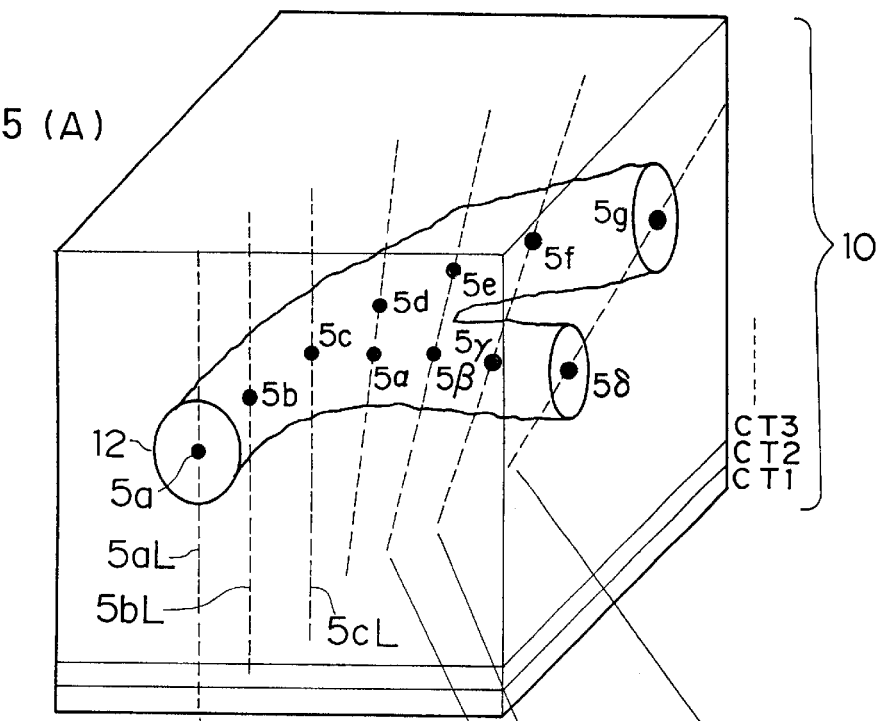
FIGS. 15(A) and 15(B) are diagrams showing another method of constructing the sectional image.
Figure 15B:
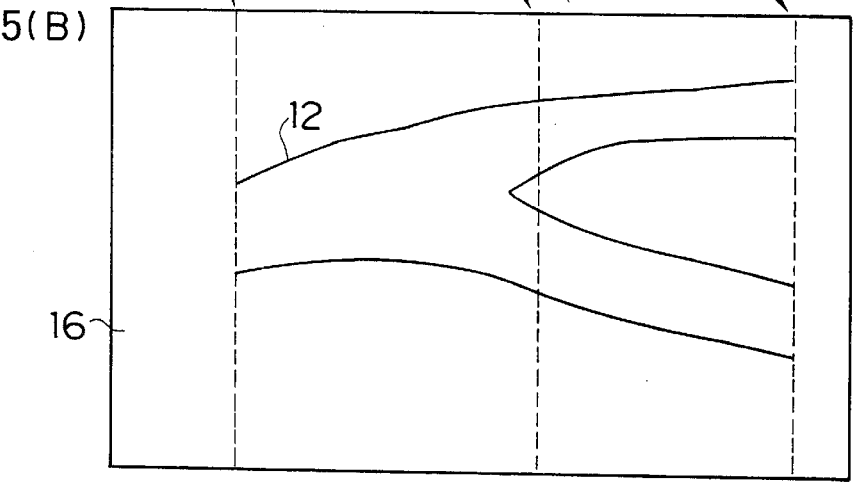

FIGS. 15(A) and 15(B) are diagrams showing another method of constructing the sectional image. As shown in FIG. 15(A), in the method, viewpoints 5a–5g, 5α–5δ are set in two routes of the branching blood vessel 12, and the blood vessel 12 is cut along a curved surface including all the viewpoints, and the sectional image is displayed. The curved surface includes the straight lines 5aL–5cL intersecting the viewpoints 5a–5c, a straight line intersecting the viewpoints 5d and 5α, a straight line intersecting the viewpoints 5e and 5β, a straight line intersecting the viewpoints 5f and 5γ and a straight line intersecting the viewpoints 5g and 5δ. The straight lines 5aL–5cL are parallel to the y-axis in FIG. 15(A), but the present invention is not limited to this.

The image information is stored in the memory 16 as shown in FIG. 15(B). A sectional image of the branching blood vessel 12 is displayed according to the image information stored in the memory 16.

Figure 16A:
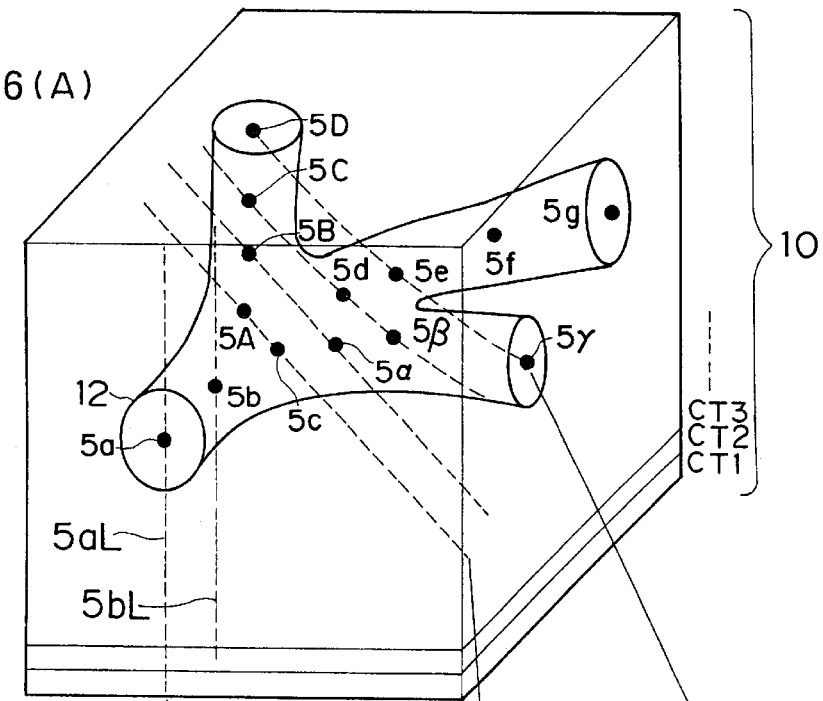
FIGS. 16(A) and 16(B) are diagrams showing another method of constructing the sectional image.
Figure 16B:
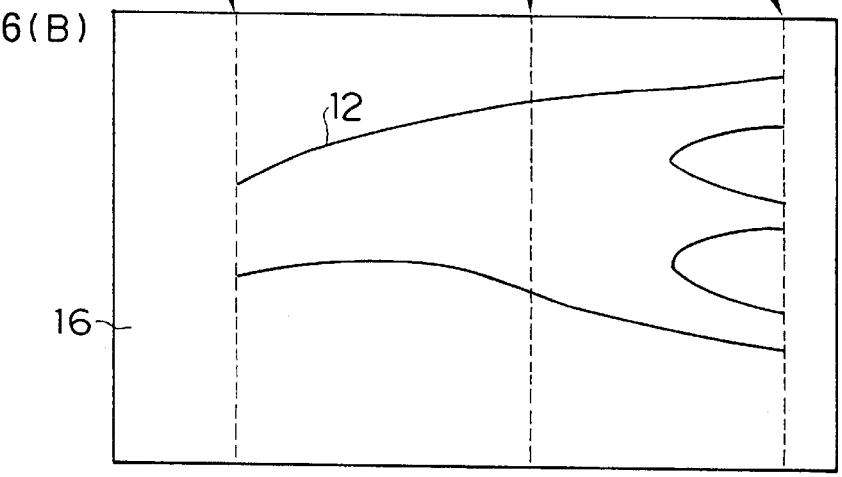

FIGS. 16(A) and 16(B) are diagrams showing another method of constructing the sectional image. As shown in FIG. 16(A), in the method, viewpoints 5a–5g, 5α–5γ, 5A–5D are set in three routes of the branching blood vessel 12, and the blood vessel 12 is cut along a curved surface including all the viewpoints, and the sectional image is displayed. The curved surface includes the straight lines 5aL–5bL intersecting the viewpoints 5a–5b, a straight line intersecting the viewpoints 5A and 5c, a straight line intersecting the viewpoints 5B and 5α, a curved line intersecting the viewpoints 5C, 5d and 5β and a curved line intersecting the viewpoints 5D, 5e and 5γ. The curved line intersecting the viewpoints 5C, 5d and 5β and the curved line intersecting the viewpoints 5D, 5e and 5γ are determined by spline interpolation. The straight lines 5aL–5bL are parallel to the y-axis in FIG. 16(A), but the present invention is not limited to this.

The image information is stored in the memory 16 as shown in FIG. 16(B). A sectional image of the branching blood vessel 12 is displayed according to the image information stored in the memory 16.

Figure 17:
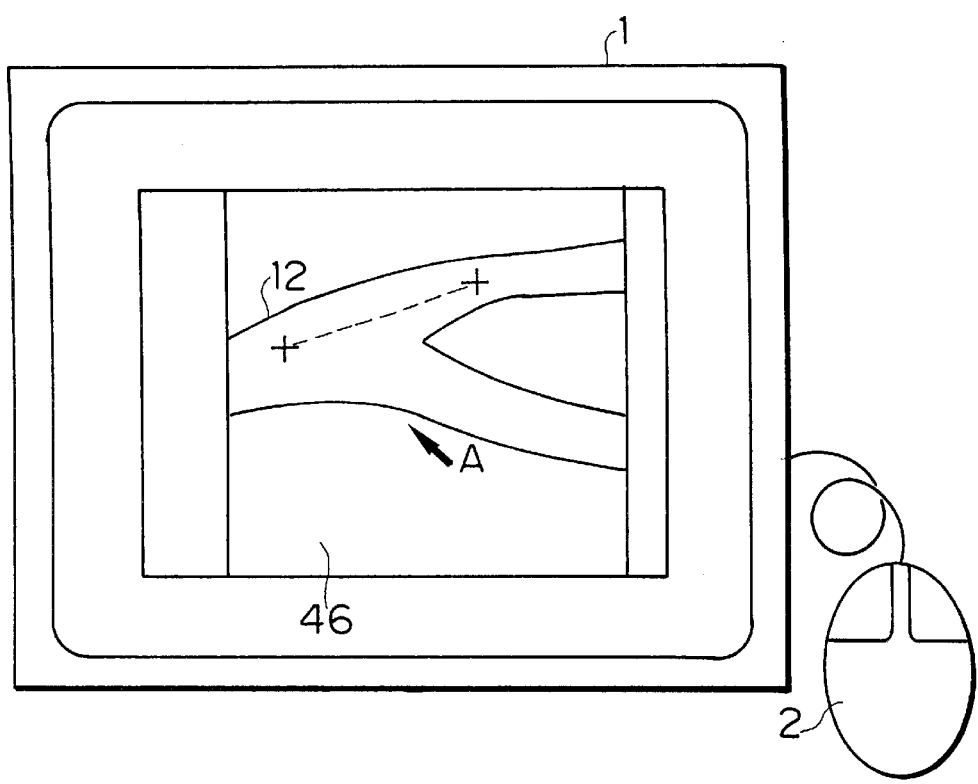
FIG. 17 is an explanation drawing showing a method of calculating a distance from a sectional image.

FIG. 17 is an explanation diagram showing a method of calculating a distance from a sectional image.

The sectional image of the blood vessel 12 is displayed on the CRT monitor 1. When the arrow A displayed on the sectional image is moved with the mouse 2 and two points along the blood vessel 12 are clicked, the two points are displayed by + and the distance between the two points is calculated. Since the sectional image of the original image cut along a curved surface is displayed as a plane, the distance between the two points is equal to the actual distance between the two points along the blood vessel 12.

Figure 18:
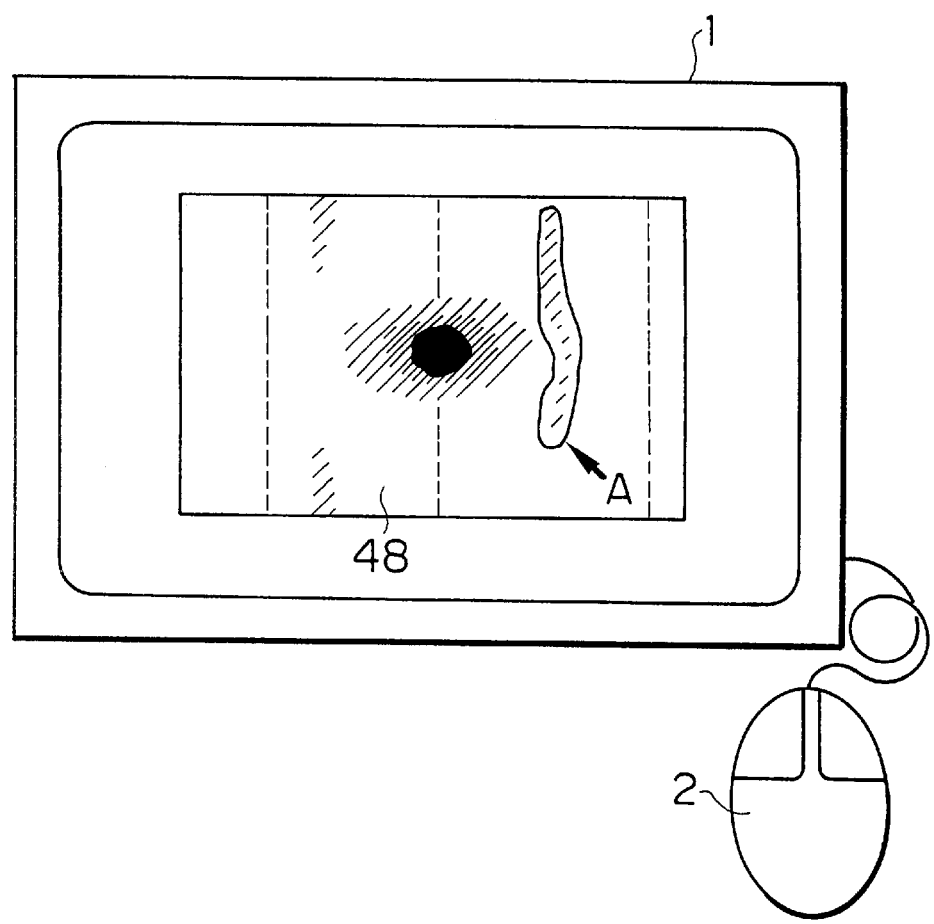

FIG. 18 is an explanation diagram showing a method of calculating an area from a three-dimensional image.

The three-dimensional image 48 of the cut-open blood vessel 12 is displayed on the CRT monitor 1. When the arrow A displayed on the three-dimensional image 48 is moved with the mouse 2 and the mouse 2 is dragged to enclose an area, the area in the blood vessel 12 is calculated.

FIG. 19 is a block diagram showing the hardware structure of the image displaying apparatus according to the present invention.

As shown in FIG. 19, the image displaying apparatus comprises a magnetic disk 50, a main memory 52, a central processing unit (CPU) 54, a display memory 56, and the CRT monitor 1, a keyboard 58 for inputting various operation instructions, position instructions and menu selection instructions, the mouse 2, a mouse controller 60 and a common bus 62 that connects the above-mentioned components.

The magnetic disk 50 stores the three-dimensional original image 10 obtained in such a manner that a plurality of CT images (CT1, CT2, CT3, . . . ) are stacked, an image constructing program, and so on. The main memory 52 stores a control program for the apparatus, and is provided with an area for calculation, and so on.

The CPU 54 reads out the three-dimensional original image 10 and various programs, and constructs the sectional image or the three-dimensional image, and sends the image data on the constructed image to the display memory 56 to display the image on the CRT monitor 1.

In the embodiment, the blood vessel is explained as the object, but the present invention can be applied to an internal organ such as an intestine and a stomach, a bone, or the like. In the embodiment, the sectional image and the three-dimensional image are displayed on one screen or switched, but they only need to correspond to each other. One of them is secondarily used, and they may be displayed on a plurality of screens.

In the embodiment, the viewpoints are set along the object, but they do not have to be set along the object, for example, in the center of the object.

INDUSTRIAL APPLICABILITY

As set forth hereinabove, according to the present invention, a sectional image of an object such as a blood vessel and an intestine that is longitudinally cut along a curved surface along the object and an image of the object cut-open so that the inside of the object can be observed including macro information on the vicinity of viewpoints can be displayed. Also, a curved surface or the like as a section can be automatically set from a plurality of viewpoints set in the central projection method.

What is claimed is:

1. An image displaying apparatus, comprising:
   a viewpoint setting device that sets a plurality of viewpoints in a tubular object included in a plurality of tomographic images;
   a section setting device that sets a section including the plurality of viewpoints set by the viewpoint setting device;
   a longitudinal sectional image constructing device that constructs a longitudinal sectional image of the tubular object intersecting the plurality of viewpoints by cutting the plurality of tomographic images along the section set by the section setting device;
   a developed image producing device that produces a developed image of the tubular object by two-dimensionally developing the longitudinal sectional image constructed by the longitudinal sectional image constructing device; and
   a displaying device that displays the developed image produced by the developed image producing device.

2. The image displaying apparatus as defined in claim 1, wherein the developed image producing device produces the developed image by two-dimensionally developing the longitudinal sectional image in a direction perpendicular to the section set by the section setting device.

3. The image displaying apparatus as defined in claim 1, wherein the developed image producing device produces the developed image by two-dimensionally developing the longitudinal sectional image in a direction forming a predetermined angle with a stacking direction of the plurality of tomographic images.

4. The image displaying apparatus as defined in claim 1, wherein:
   the section setting device sets first and second sections including the plurality of viewpoints set by the viewpoint setting device, the first and second sections being perpendicular to each other;
   the longitudinal sectional image constructing device constructs first and second longitudinal sectional images of the tubular object intersecting the plurality of viewpoints by cutting the plurality of tomographic images along the first and second sections set by the section setting device, respectively; and
   the developed image producing device produces first and second developed images of the tubular object by two-dimensionally developing the first and second longitudinal sectional images constructed by the longitudinal sectional image constructing device, respectively.

5. The image displaying apparatus as defined in claim 1, further comprising:
   a light source setting device that sets, as an imaginary line light source, a line intersecting the plurality of viewpoints set by the viewpoint setting device,
   wherein the developed image producing device shades the longitudinal sectional image with the imaginary line light source set by the light source setting device, and two-dimensionally develops the shaded longitudinal sectional image, in order to produce the developed image with shading.

6. The image displaying apparatus as defined in claim 1, wherein:
   the section setting device sets a plurality of sections including the plurality of viewpoints set by the viewpoint setting device, the plurality of sections being not parallel to each other;
   the longitudinal sectional image constructing device constructs a plurality of longitudinal sectional images of the tubular object intersecting the plurality of viewpoints by cutting the plurality of tomographic images along the plurality of sections set by the section setting device, respectively;
   the developed image producing device produces a plurality of developed images of the tubular object by two-dimensionally developing the plurality of longitudinal sectional images constructed by the longitudinal sectional image constructing device, respectively; and
   the displaying device sequentially displays the plurality of developed images produced by the developed image producing device.

7. The image displaying apparatus as defined in claim 1, wherein:
   the section setting device sets first and second sections including the plurality of viewpoints set by the viewpoint setting device, the first and second sections being not parallel to each other;

the longitudinal sectional image constructing device constructs first and second longitudinal sectional images of the tubular object intersecting the plurality of viewpoints by cutting the plurality of tomographic images along the first and second sections set by the section setting device, respectively;

the developed image producing device produces first and second developed images of the tubular object by two-dimensionally developing the first and second longitudinal sectional images constructed by the longitudinal sectional image constructing device, respectively; and the displaying device displays the first and second developed images produced by the developed image producing device.

8. The image displaying apparatus as defined in claim 7, wherein the displaying device sequentially displays the first and second developed images produced by the developed image producing device.

9. The image displaying apparatus as defined in claim 1, wherein the displaying device superimposes at least one of the plurality of viewpoints set by the viewpoint setting device and visual fields from the plurality of viewpoints over the developed image produced by the developed image producing device.

10. The image displaying apparatus as defined in claim 1, further comprising:

a three-dimensional image constructing device that constructs a three-dimensional-like image by parallel-projecting a stacked image obtained by stacking the plurality of tomographic images, wherein the displaying device displays the developed image produced by the developed image producing device and the three-dimensional-like image constructed by the three-dimensional image constructing device.

11. An image displaying method, comprising the steps of:

setting a plurality of viewpoints in a tubular object included in a plurality of tomographic images;

setting a section including the plurality of viewpoints;

constructing a longitudinal sectional image of the tubular object intersecting the plurality of viewpoints by cutting the plurality of tomographic images along the section;

producing a developed image of the tubular object by two-dimensionally developing the longitudinal sectional image; and displaying the developed image.

12. The image displaying method as defined in claim 11, wherein the developed image producing step comprises the step of producing the developed image by two-dimensionally developing the longitudinal sectional image in a direction perpendicular to the section.

13. The image displaying method as defined in claim 11, wherein the developed image producing step comprises the step of producing the developed image by two-dimensionally developing the longitudinal sectional image in a direction forming a predetermined angle with a stacking direction of the plurality of tomographic images.

14. The image displaying method as defined in claim 11, wherein:

the section setting step comprises the step of setting first and second sections including the plurality of viewpoints, the first and second sections being perpendicular to each other;

the longitudinal sectional image constructing step comprises the step of constructing first and second longitudinal sectional images of the tubular object intersecting the plurality of viewpoints by cutting the plurality of tomographic images along the first and second sections, respectively; and the developed image producing step comprises the step of producing first and second developed images of the tubular object by two-dimensionally developing the first and second longitudinal sectional images, respectively.

15. The image displaying method as defined in claim 11, further comprising the step of:

setting, as an imaginary line light source, a line intersecting the plurality of viewpoints, wherein the developed image producing step comprises the steps of shading the longitudinal sectional image with the imaginary line light source, and two-dimensionally developing the shaded longitudinal sectional image, in order to produce the developed image with shading.

16. The image displaying method as defined in claim 11, wherein:

the section setting step comprises the step of setting a plurality of sections including the plurality of viewpoints, the plurality of sections being not parallel to each other;

the longitudinal sectional image constructing step comprises the step of constructing a plurality of longitudinal sectional images of the tubular object intersecting the plurality of viewpoints by cutting the plurality of tomographic images along the plurality of sections, respectively;

the developed image producing step comprises the step of producing a plurality of developed images of the tubular object by two-dimensionally developing the plurality of longitudinal sectional images, respectively; and the displaying step comprises the step of sequentially displaying the plurality of developed images.

17. The image displaying method as defined in claim 11, wherein:

the section setting step comprises the step of setting first and second sections including the plurality of viewpoints, the first and second sections being not parallel to each other;

the longitudinal sectional image constructing step comprises the step of constructing first and second longitudinal sectional images of the tubular object intersecting the plurality of viewpoints by cutting the plurality of tomographic images along the first and second sections, respectively;

the developed image producing step comprises the step of producing first and second developed images of the tubular object by two-dimensionally developing the first and second longitudinal sectional images, respectively; and the displaying step comprises the step of displaying the first and second developed images.

18. The image displaying method as defined in claim 17, wherein the displaying step comprises the step of sequentially displaying the first and second developed images.

19. The image displaying method as defined in claim 11, wherein the displaying step comprises the step of superimposing at least one of the plurality of viewpoints and visual fields from the plurality of viewpoints over the developed image.

20. The image displaying method as defined in claim 11, further comprising the step of:
constructing a three-dimensional-like image by parallel-projecting a stacked image obtained by stacking the plurality of tomographic images,
wherein the displaying step comprises the step of displaying the developed image and the three-dimensional-like image.

* * * * *